United States Patent
Bjorsell et al.

(10) Patent No.: US 11,223,502 B2
(45) Date of Patent: Jan. 11, 2022

(54) METHOD FOR PREDICTING THE CHANNEL BETWEEN A TRANSMITTER/RECEIVER AND A CONNECTED VEHICLE

(71) Applicant: ORANGE, Issy-les-Moulineaux (FR)

(72) Inventors: Joachim Bjorsell, Chatillon (FR); Mikael Sternad, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/255,122

(22) PCT Filed: Jun. 21, 2019

(86) PCT No.: PCT/FR2019/051526
§ 371 (c)(1),
(2) Date: Dec. 22, 2020

(87) PCT Pub. No.: WO2020/002803
PCT Pub. Date: Jan. 2, 2020

(65) Prior Publication Data
US 2021/0273829 A1    Sep. 2, 2021

(30) Foreign Application Priority Data

Jun. 25, 2018 (FR) ...................... 1855669

(51) Int. Cl.
| | |
|---|---|
| H04B 17/373 | (2015.01) |
| H04L 25/02 | (2006.01) |
| H04W 64/00 | (2009.01) |
| H04W 84/00 | (2009.01) |

(52) U.S. Cl.
CPC ....... H04L 25/0212 (2013.01); H04B 17/373 (2015.01); H04L 25/0204 (2013.01); H04W 64/006 (2013.01); H04W 84/005 (2013.01)

(58) Field of Classification Search
CPC .......... H04L 25/0212; H04L 25/0204; H04W 64/006; H04W 84/005; H04B 17/373
See application file for complete search history.

(56) References Cited

FOREIGN PATENT DOCUMENTS

| WO | WO/2019/149353 A1 * | 8/2019 |
| WO | WO/2019/158179 A1 * | 8/2019 |

OTHER PUBLICATIONS

A System Level Evaluation of SRTA-PI Transmission Scheme in the High-Speed Train Use Case, by Alessandro Grassi, Giuseppe Piro, Gennaro Boggia (Year: 2018).*
Bjorsell Joachim et al. "Predictor antennas in action", 2017 IEEE 28th Annual International Symposium on Personal, Indoor, and Mobile Radio Communications (PIMRC), IEEE, Oct. 8, 2017 (Oct. 8, 2017), pp. 1-7, [retrieved on Feb. 14, 2018] DOI: 10.1109/PIMRC.2017.8292235, XP033321130.
Bjorsell Joachim et al. "Using predictor antennas for the prediction of small-scale fading provides an order-of-magnitude improvement of prediction horizons", 2017 IEEE International Conference on Communications Workshops (ICC Workshops), IEEE, May 21, 2017 (May 21, 2017), pp. 54-60, DOI: 10.1109/ICCW.2017.7962633, XP033111445.
Sternad et al., "Using "Predictor Antennas" for Long-Range Prediction of Fast Fading for Moving Relays", IEEE Wireless Communications and Networking Conference, Paris, Apr. 2012.
Bjorsell et al., "Predictor Antennas in Action", IEEE International Symposium on Personal, Indoor 5 and Mobile Radio Communications, Montreal, Oct. 2017.
Sui et al., "The Potential of Moving Relays—A Performance Analysis", IEEE Vehicular Technology Conference, Yokohama, May 2012.
International Search Report dated Sep. 20, 2019 for corresponding International Application No. PCT/FR2019/051526, filed Jun. 21, 2019.
Written Opinion of the International Searching Authority dated Sep. 20, 2019 for corresponding International Application No. PCT/FR2019/051526, filed Jun. 21, 2019.

* cited by examiner

*Primary Examiner* — Siu M Lee
(74) *Attorney, Agent, or Firm* — David D. Brush; Westman, Champlin & Koehler, P.A.

(57) ABSTRACT

Predicting a channel between a transceiver and a connected vehicle having a "main antenna", dedicated to exchanges of payload data with the transceiver, and a "predictor antenna", placed in front of the main antenna to predict the radio channel dealt with by the main antenna when reaching the current position of the predictor antenna. The method includes: selecting, using an estimate of the vehicle's speed and acceleration, for a multiplet of channel samples measured at the main antenna, a multiplet of channel samples measured at the predictor antenna, each sample of the predictor antenna being selected to correspond to a sample of the main antenna subsequently measured at the same position; calculating a criterion associating multiplets of samples measured at the main and predictor antennas; and selecting samples of the predictor antenna using a speed/acceleration pair optimizing the criterion, to predict the channel between the transceiver and main antenna.

14 Claims, No Drawings

METHOD FOR PREDICTING THE CHANNEL BETWEEN A TRANSMITTER/RECEIVER AND A CONNECTED VEHICLE

CROSS-REFERENCE TO RELATED APPLICATIONS

This Application is a Section 371 National Stage Application of International Application No. PCT/FR2019/051526, filed Jun. 21, 2019, the content of which is incorporated herein by reference in its entirety, and published as WO 2020/002803 on Jan. 2, 2020, not in English.

FIELD OF THE DISCLOSURE

The field of the invention is that of radio communications between communicating objects in relative motion.

More specifically, the present invention relates to radio communications between a network entity comprising a transceiver, such as a base station, and a moving connected vehicle.

BACKGROUND OF THE DISCLOSURE

Generally, a radio signal transmitted by an antenna of a communicating entity, known as antenna signal, undergoes deformations depending on the propagation conditions between a defined point of origin at the output of the originating antenna and a defined destination point at the input of an antenna of the destination communicating entity. In order to correct these deformations, the antenna signal is distorted beforehand by applying pre-equalization coefficients on the basis of the characteristics of the propagation channel between these two antennas. It is therefore necessary to characterize this propagation channel.

Estimates of a radio communication channel are generally obtained by having one of the communicating entities send known reference signals, recording the signals received by the other communicating entity and then calculating an estimate of the channel at the time and for the frequency of the reference signal. For example, in communication systems that use OFDM (acronym for "Orthogonal Frequency Division Multiplexing") modulation, channel estimates are in the form of complex gains for each sub-carrier of the OFDM symbol over which the reference signals have been transmitted.

The need to estimate the radio communication channel is for example crucial in the field of connected vehicles. Specifically, communications with an increasing number of connected vehicles, in particular public transport vehicles, will become very costly in terms of power and bandwidth unless advanced communication methods are used. These will be based on channel estimates at the transmitter ("Channel State Information at the Transmitter", or CSIT).

A first problem associated with communications with connected vehicles relates to the power losses as the waves penetrate from the outside to the inside of the vehicle; in practice, these losses have a significant impact on the performance of the system. More specifically, measurements have shown that the penetration losses in a vehicle may be as high as 25 dB for a user equipment that receives waves at a frequency of 2.4 GHz inside a van. Even greater losses are projected for higher frequencies, for example for bands around 3.5 GHz allocated to next-generation mobile communication systems, and for certain vehicles that have a high degree of insulation against electromagnetic waves.

In order to overcome this first problem, it has been proposed (cf. the article by Y. Sui, A. Papadogiannis and T. Svensson entitled "*The Potential of Moving Relays—A Performance Analysis*", IEEE Vehicular Technology Conference, Yokohama, May 2012) to equip the vehicle, for example a bus or a tram, with a mobile relay located on the outside of the vehicle. This mobile relay uses an external antenna (typically on the roof of the vehicle), which is connected to an antenna located inside the vehicle. The external antenna communicates with the base station (backhaul link), while the internal antenna communicates with the user devices by means of a local area communication network (for example a Wi-Fi network). The effectiveness of a communication system of this kind then depends on the performance and the reliability of the link between the relay and the base station.

A second problem associated with communications with connected vehicles is that the channel varies depending on the position of the external antenna. After an external antenna of the vehicle has transmitted a reference signal, the base station transmits a pre-equalized useful signal based on the channel estimate with a certain processing delay $\theta$ (around 5 ms in the case of LTE (Long Term Evolution) systems, for example); but, during this delay, the vehicle has moved, with the result that the channel between the base station and the external antenna is no longer the same as when the reference signal was transmitted. Nevertheless, in the prior art, the useful signal may be pre-equalized in view of a given movement D of the antenna of the vehicle up to a certain maximum $D_{max}$ (typically around 0.3 carrier wavelengths) on the basis of the current channel estimate and previous channel estimates and taking into account the classic fast-fading phenomenon, i.e. the variations in the amplitude of the received signal caused by the reflections of the electromagnetic waves from objects near the receiver. Unfortunately, at the speeds that are usual in an urban area (around 50 km/h) and at the usual carrier frequencies (in the GHz range), the vehicle moves by $\theta$ over a distance greater than said maximum $D_{max}$.

In order to overcome this second problem, there has been proposed a method known as "Predictor Antenna" method (cf. the article by M. Sternad, M. Grieger, R. Apelfröjd, T. Svensson, D. Aronsson and A. Bel& Martinez entitled "*Using predictor antennas for long-range prediction of fast fading for moving relays*", IEEE Wireless Communications and Networking Conference, Paris, April 2012), which uses, on the outside of the vehicle, an additional antenna, which is known as "predictor antenna"; this predictor antenna is placed in front of the external antenna (known as "main antenna") dedicated to exchanges of payload data with the base station. Estimating the baseband radio channel at the current position of the predictor antenna makes it possible to predict which channels the main antenna (which is thus placed behind the predictor antenna) will be dealing with once the main antenna reaches the current position of the predictor antenna.

The predictor antenna method thus advantageously makes it possible to predict channel estimates over periods of time that are longer by an order of magnitude than those applicable on the basis of the extrapolation of channel measurements in the past. This method is therefore extremely worthwhile for application to connected vehicles that employ an advanced radio infrastructure.

For processing of the signal, for evaluation of a statistical model of the change in the channel with respect to time and frequency, and also for channel prediction, it is highly desirable to have a series of time samples that are regularly spaced out over time. This is the case, in particular, for the predictor antenna method. Now, the position of the reference signals with respect to time, to the frequency and to the antenna port is determined by the communication standard used and by implementation choices. Unfortunately, in many communication systems, this position is not regular over time. This is the case, in particular, for Time-Division Duplex (TDD) transmissions, in which the estimation by the base station of the channels on the uplink, by using reference signals that are also on the uplink, is interrupted by transmission intervals on the downlink, during which the base station has no reference signal. In these communication systems, it is therefore necessary to implement an interpolation method in order to obtain, from series of channel estimates that are irregularly spaced out over time, a series of channel estimates that are situated as required in time, for example regularly spaced out over time.

To this end, it is possible to use for example the algorithm described in the article by J. Björsell, M. Sternad and M. Grieger entitled "Predictor Antennas in Action" (IEEE International Symposium on Personal, Indoor and Mobile Radio Communications, Montreal, October 2017). This algorithm performs interpolation and noise filtering on measurements taken on the basis of aperiodic signals used as reference signals.

Let us assume here for simplicity that a single predictor antenna is used, as well as a single main antenna (for the exchange of payload data with the base station). According to this algorithm, the value that will be assumed by the complex scalar channel $h_m$ picked up by the main antenna $\tau$ seconds later is predicted by multiplying the previously estimated and appropriately delayed channel $h_p$ picked up by the predictor antenna by a coefficient with complex values $a_h$ according to the following equation:

$$\hat{h}_m(t+\tau) = a_h \hat{h}_p(t+\tau-\Delta t), \qquad (1)$$

where t is the current instant, $\hat{h}_p(t+\tau-\Delta t)$ is an estimate of $h_p$ obtained from noisy measurements taken before the instant t, and $\Delta t$ is the time shift between the predictor antenna and the main antenna occupying the same position.

The algorithm comprises two parts that operate in conjunction with one another: a part that operates with a slow time scale, known as "slow scale part", and a part that operates with a fast time scale, known as "fast scale part". The fast scale part generates a new prediction at successive time intervals known as "prediction intervals", with a short period. The slow scale part generates parameters at successive time intervals with a long period, which is a multiple of the short period.

The slow scale part estimates the coefficient $a_h$ and the speed v of the vehicle on the basis of channel measurements, stored in a buffer memory, made at the predictor antenna and the main antenna. More specifically, the coefficient $a_h$ is evaluated on the basis of the maximum correlation between samples measured at the two antennas, and the speed v is determined on the basis of the value of the time shift between the antennas that maximizes the correlation between the antennas (the distance between the antennas being known beforehand). In other words, the speed of the vehicle is determined indirectly by way of an intensive search: all of the possible combinations of pairings between the samples measured at the predictor antenna and the main antenna are calculated in order to find the pairing that provides the greatest correlation.

As a result, a third problem associated with communications with connected vehicles is that an error in determining the speed may result in an incorrect pairing between the samples, thereby in turn reducing the performance of the channel predictions. In addition, the size of the effects caused by such errors is unknown, which means that the accuracy of the determination of the speed of the vehicle obtained according to the prior art is also unknown.

SUMMARY

The present invention therefore relates, according to a first aspect, to a method for predicting a channel between a transceiver and a connected vehicle, said vehicle comprising at least one antenna, known as "main antenna", dedicated to exchanges of payload data with said transceiver, and at least one other antenna, known as "predictor antenna", placed in front of the main antenna, the estimate of the radio channel at a current position of the predictor antenna making it possible to predict the radio channel that the main antenna will be dealing with when the main antenna reaches the current position of the predictor antenna. Said method is noteworthy in that it comprises the following steps:

selecting, on the basis of an initial estimate of the speed and of the acceleration of the vehicle, for a given multiplet of channel samples measured at the main antenna, a multiplet of channel samples measured at the predictor antenna, each sample of the predictor antenna being selected such that it corresponds to a given sample of the main antenna subsequently measured at the same position, assuming that the vehicle has moved at said estimated speed and said estimated acceleration, calculating a criterion associating said multiplet of samples measured at the main antenna with said multiplet of samples measured at the predictor antenna, determining the speed/acceleration pair that optimizes said criterion, and, in order to predict the channel between the transceiver and the main antenna, selecting samples of the predictor antenna by way of said determined speed/acceleration pair.

It will be noted that said criterion may for example be the optimization of a correlation coefficient between a series of samples measured at the main antenna and a series of samples measured at the predictor antenna, or the optimization of the value $a_h$ mentioned above in equation (1).

The present invention thus makes it possible to estimate the movement of a vehicle equipped with at least one main antenna and with at least one predictor antenna with respect to a transceiver, that is to say jointly estimate the speed and the acceleration of said vehicle.

These provisions improve the accuracy of the determination of the speed of the vehicle, and therefore the reliability of the channel estimates, in particular in the case of a vehicle moving at a variable speed. Specifically, good evaluations of the speed and of the acceleration of the vehicle increase the accuracy of the channel prediction by increasing the accuracy of the identification over time of the sample measured at the predictor antenna, which corresponds to a prediction horizon given for the main antenna.

It will be noted that the estimates according to the invention are advantageously obtained here without resorting to external speed measurements, which would be performed for example using tachometers or a GPS (Global Positioning System). This feature simplifies the implementation of the predictor antenna method in connected vehicles.

According to particular features, said method comprises, for at least one pair of multiplets comprising a multiplet $$h_m = [h_m(0), \ldots, h_m(N-1)]$$

of N samples $h_m(k)$ measured at the main antenna, and a multiplet $$h_p = [h_p(0), \ldots, h_p(N-1)]$$

of N samples $h_p(k)$ measured at the predictor antenna, the following steps:
- choosing an integer X>1, and subdividing each multiplet $k_m$ and $h_p$ into X sub-multiplets each comprising $N_x = N/X$ samples, so as to obtain the pairs of sub-multiplets $$h_{m,i} = [h_m((i-1)N_x), \ldots, h_m(iN_x - 1)]$$

and $$h_{p,i} = [h_p((i-1)N_x), \ldots, h_p(iN_x - 1)],$$

where $i = \{1, \ldots, X\}$,
- subtracting the $k_0$ first samples from each sub-multiplet $h_{m,i}$ and the $k_0$ last samples from each sub-multiplet $h_{p,i}$, where $k_0$ is the number of samples measured during the time it takes for the main antenna to reach the position of the predictor antenna, on the basis of an initial conjecture of the speed and of the acceleration of the vehicle,
- estimating the average speed for each pair of sub-multiplets by maximizing the correlation between the sub-multiplets of this pair,
- obtaining the multiplet of speeds $v = \{v_{i=1}, \ldots, v_{i=X}\}$ representing the estimated speeds for the samples numbered $$k = \{N_x/2, 3N_x/2, \ldots, (2X-1)N_x/2\}, \text{ and}$$

- obtaining, from said multiplet of speeds v, an estimated acceleration $a_{c,est}$ and an estimated speed $v_{0,est}$ of the vehicle, where $v_{0,est}$ is equal to the estimated speed of the vehicle at the instant of the measurement of the sample $k=0$.

This first embodiment has the advantage of being relatively simple to implement.

According to other particular features, said method comprises, for at least one pair of multiplets comprising a multiplet $$h_m = [h_m(0), \ldots, h_m(N-1)]$$

of N samples $h_m(k)$ measured at the main antenna, and a multiplet $$h_p = [h_p(0), \ldots, h_p(N-1)]$$

of N samples $h_p(k)$ measured at the predictor antenna, the following steps:
- subtracting the $k_0$ first samples measured at the main antenna and the $k_0$ last samples measured at the predictor antenna, where $k_0$ is the number of samples measured during the time it takes for the main antenna to reach the position of the predictor antenna, on the basis of an initial conjecture of the speed and of the acceleration of the vehicle, so as to obtain the multiplets of samples $$h'_m = [h_m(k_0), \ldots, h_m(N-1)]$$

and $$h'_p = [h_p(0), \ldots, h_p(N-1-k_0)],$$

- choosing an integer X>1, and subdividing each multiplet $h'_m$ and $h'_p$ into X sub-multiplets of $N_x = (N-k_0)/X$ samples, so as to obtain the pairs of sub-multiplets $$h'_{m,i} = [h_m(k_0 + (i-1)N_x), \ldots, h_m(k_0 + iN_x - 1)]$$

and $$h'_{p,i} = [h_p((i-1)N_x), \ldots, h_p(iN_x - 1)],$$

where $i = \{1, \ldots, X\}$,
- estimating, for each such pair of sub-multiplets, the average speed by maximizing the correlation between the sub-multiplets of this pair, so as to obtain a series of estimated speeds $v = \{v_{i=1}, \ldots, v_{i=X}\}$ representing the estimated speeds for the samples numbered $$k = \{(k_0+N)/2, (k_0+3N)/2, \ldots, (k_0+(2X-1)N_x)/2\},$$

- obtaining, from these speed estimates v, an estimated acceleration $a_c = a_{c,est}$ and an estimated speed $v_{0,est}$ of the vehicle, and deducing therefrom the estimated speed $$v_0 = v_{avg,init} + v_{0,est}$$

of the vehicle at the instant of the measurement of the sample $k=0$, where $v_{avg,init}$ is the average speed conjectured over the time interval during which the N samples are measured.

This second embodiment has the advantage of providing better estimates than the first embodiment, in particular for large multiplets (that is to say using lengthy series of measurements), but at the cost of calculations that are slightly more complex than the first embodiment.

According to yet more particular features, said method comprises the following steps:
- calculating the time interval $\Delta^+(t)$ representing the time it will take for the main antenna to reach the location where the predictor antenna is located at the instant t,
- calculating the time interval $\Delta^-(t)$ representing the time elapsed since the predictor antenna was located at the location where the main antenna is located at the instant t,
- deducing therefrom the shifts $\Delta_k^+(k)$ and $\Delta_k^-(k)$ in terms of numbers of samples k corresponding respectively to $\Delta^+(t)$ and $\Delta^-(t)$,
- removing, in a multiplet of N samples measured at the main antenna, samples with a number less than $k_0 = \Delta_k^+(0)$,
- for various conjectured pairs $(v_0, a_c)$, determining, by way of the values of $\Delta^+(t)$, $\Delta^-(t)$, $\Delta_k^+(k)$ and $\Delta_k^-(k)$, which samples measured at the main antenna should be associated with which samples measured at the predictor antenna, and calculating the average correlation between a multiplet of samples measured at the main antenna and the associated multiplet of samples measured at the predictor antenna, and
- determining which pair $(v_0, a_c)$ maximizes said average correlation.

This third embodiment has the advantage of providing even better estimates than the first two embodiments, but at the cost of more complex calculations.

Correlatively, according to a second aspect, the invention relates to a network entity used in the prediction of a channel between a transceiver and a connected vehicle, said vehicle comprising at least one antenna, known as "main antenna", dedicated to exchanges of payload data with said transceiver, and at least one other antenna, known as "predictor antenna", placed in front of the main antenna, the estimate of the radio channel at a current position of the predictor antenna making it possible to predict the radio channel that the main antenna will be dealing with when the main antenna reaches the current position of the predictor antenna. Said network entity is noteworthy in that it comprises means for:

- selecting, on the basis of an initial estimate of the speed and of the acceleration of the vehicle, for a given multiplet of channel samples measured at the main antenna, a multiplet of channel samples measured at the predictor antenna, each sample of the predictor antenna being selected such that it corresponds to a given sample of the main antenna subsequently measured at the same position, assuming that the vehicle has moved at said estimated speed and said estimated acceleration,
- calculating a criterion associating said multiplet of samples measured at the main antenna with said multiplet of samples measured at the predictor antenna,
- determining the speed/acceleration pair that optimizes said criterion, and,
- in order to predict the radio channel between the transceiver and the main antenna, selecting samples of the predictor antenna by way of said determined speed/acceleration pair.

This network entity may advantageously be accommodated in a physical network node or a virtual network node (in the "cloud") that is responsible for managing downlink transmissions, for example in a base station or an MSC ("mobile switching center") of a cellular communication network.

According to particular features, said network entity furthermore comprises, for at least one pair of multiplets comprising a multiplet $$h_m = [h_m(0), \ldots, h_m(N-1)]$$

of N samples $h_m(k)$ measured at the main antenna, and a multiplet $$h_p = [h_p(0), \ldots, h_p(N-1)]$$

of N samples $h_p(k)$ measured at the predictor antenna, means for:

- choosing an integer X>1, and subdividing each multiplet $k_m$ and $h_p$ into X sub-multiplets each comprising $N_x = N/X$ samples, so as to obtain the pairs of sub-multiplets $$h_{m,i} = [h_m((i-1)N_x), \ldots, h_m(iN_x-1)]$$

and $$h_{p,i} = [h_p((i-1)N_x), \ldots, h_p(iN_x-1)],$$

where $i = \{1, \ldots, X\}$,

- subtracting the $k_0$ first samples from each sub-multiplet $h_{m,i}$ and the $k_0$ last samples from each sub-multiplet $h_{p,i}$, where $k_0$ is the number of samples measured during the time it takes for the main antenna to reach the position of the predictor antenna, on the basis of an initial conjecture of the speed and of the acceleration of the vehicle,
- estimating the average speed for each pair of sub-multiplets by maximizing the correlation between the sub-multiplets of this pair,
- obtaining the multiplet of speeds $v = \{v_{i=1}, v_{1=X}\}$ representing the estimated speeds for the samples numbered $$k = \{N_x/2, 3N_x/2, \ldots, (2X-1)N_x/2\}, \text{ and}$$

- obtaining, from said multiplet of speeds v, an estimated acceleration $a_{c,est}$ and an estimated speed $v_{0,est}$ of the vehicle, where $v_{0,est}$ is equal to the estimated speed of the vehicle at the instant of the measurement of the sample k=0.

According to other particular features, said network entity furthermore comprises, for at least one pair of multiplets comprising a multiplet $$h_m = [h_m(0), \ldots, h_m(N-1)]$$

of N samples $h_m(k)$ measured at the main antenna, and a multiplet $$h_p = [h_p(0), \ldots, h_p(N-1)]$$

of N samples $h_p(k)$ measured at the predictor antenna, means for:

- subtracting the $k_0$ first samples measured at the main antenna and the $k_0$ last samples measured at the predictor antenna, where $k_0$ is the number of samples measured during the time it takes for the main antenna to reach the position of the predictor antenna, on the basis of an initial conjecture of the speed and of the acceleration of the vehicle, so as to obtain the multiplets of samples $$h'_m = [h_m(k_0), \ldots, h_m(N-1)]$$

and $$h'_p = [h_p(0), \ldots, h_p(N-1-k_0)],$$

- choosing an integer X>1, and subdividing each multiplet $h'_m$ and $h'_p$ into X sub-multiplets of $N_x = (N-k_0)/X$ samples, so as to obtain the pairs of sub-multiplets $$h'_{m,i} = [h_m(k_0+(i-1)N_x), \ldots, h_m(k_0+iN_x-1)]$$

and $$h'_{p,i} = [h_p((i-1)N_x), \ldots, h_p(iN_x-1)],$$

where $i = \{1, \ldots, X\}$,

- estimating, for each such pair of sub-multiplets, the average speed by maximizing the correlation between the sub-multiplets of this pair, so as to obtain a series of estimated speeds $v = \{v_{i-1}, \ldots, v_{i=X}\}$ representing the estimated speeds for samples numbered $$k = \{(k_0+N_x)/2, (k_0+3N_x)/2, \ldots, (k_0+(2X-1)N_x)/2\},$$

- obtaining, from these speed estimates v, an estimated acceleration $a_c = a_{c,est}$ and an estimated speed $v_{0,est}$ of the vehicle, and
- deducing therefrom the estimated speed $$v_0 = v_{avg,init} + v_{0,est}$$

of the vehicle at the instant of the measurement of the sample k=0, where $v_{avg,init}$ is the average speed conjectured over the time interval during which the N samples are measured.

According to yet more particular features, said network entity furthermore comprises means for:

- calculating the time interval $\Delta^+(t)$ representing the time it will take for the main antenna to reach the location where the predictor antenna is located at the instant t,
- calculating the time interval $\Delta^-(t)$ representing the time elapsed since the predictor antenna was located at the location where the main antenna is located at the instant t,
- deducing therefrom the shifts $\Delta_k^+(k)$ and $\Delta_k^-(k)$ in terms of numbers of samples k corresponding respectively to $\Delta^+(t)$ and $\Delta^-(t)$,
- removing, in a multiplet of N samples measured at the main antenna, samples with a number less than $k_0 = \Delta_k^+(0)$,
- for various conjectured pairs $(v_0, a_c)$, determining, by way of the values of $\Delta^+(t)$, $\Delta^-(t)$, $\Delta_k^+(k)$ and $\Delta_k^-(k)$, which samples measured at the main antenna should be associated with which samples measured at the predictor antenna, and calculating the average correlation between a multiplet of samples measured at the main antenna and the associated multiplet of samples measured at the predictor antenna, and determining which pair ($v_0$, $a_c$) maximizes said average correlation.

The advantages offered by these network entities are essentially the same as those offered by the corresponding methods succinctly set forth above.

It should be noted that it is possible to implement these network entities in the context of software instructions and/or in the context of electronic circuits.

According to a third aspect, the invention relates to a communication network. Said communications network is characterized in that it comprises:

at least one network entity as has been succinctly described above, and at least one vehicle equipped with at least one main antenna and with at least one predictor antenna.

The advantages offered by this communication network are essentially the same as those offered by the corresponding methods succinctly set forth above.

Another subject of the invention is a computer program that is able to be downloaded from a communication network and/or is stored on a computer-readable medium and/or is able to be executed by a microprocessor. This computer program is noteworthy in that it comprises instructions for executing the steps of the channel prediction method succinctly set forth above when it is executed on a computer.

The advantages offered by this computer program are essentially the same as those offered by said method.

DETAILED DESCRIPTION OF ILLUSTRATIVE EMBODIMENTS

Other aspects and advantages of the invention will become apparent on reading the detailed description below of particular embodiments, which are given by way of nonlimiting example.

These embodiments implement, in the context of a predictor antenna method, the following main steps.

a) By using a time window of channel estimates made at the predictor antenna and the main antenna, estimating the effective speed and the effective acceleration of the vehicle.

b) Once the speed of the vehicle is known as a function of time, it is possible to determine, taking into account the distance d between the two antennas, the preceding instant at which the predictor antenna was located at the current position of the main antenna; it is then possible to select, from the set of channel measurements made in the past at the predictor antenna, the one that was performed at this previous instant.

When a base station then exchanges payload data with the main antenna, the signal transporting these payload data will advantageously be pre-equalized by way of the channel measurement that was performed by the predictor antenna at the position where the main antenna is currently located.

If the acceleration $a_c$ is non-zero, then the time interval $\Delta t$ involved in equation (1) above is variable over time. To simplify the disclosure, it will be assumed below that the acceleration $a_c$ of the vehicle is constant during the series of measurements under consideration.

A first embodiment will now be described.

The steps of this embodiment are implemented for at least one pair of multiplets comprising a multiplet of N samples $$h_m = [h_m(0), \ldots, h_m(N-1)]$$

measured at the main antenna, and a multiplet of N samples $$h_p = [h_p(0), \ldots, h_p(N-1)]$$

measured at the predictor antenna.

In a first step, an integer X>1 is chosen freely, and each multiplet $h_m$ and $h_p$ is subdivided into X sub-multiplets each comprising $$N_x = N/X$$

samples. The pairs of sub-multiplets $$h_{m,i} = [h_m((i-1)N_x), \ldots, h_m(iN_x-1)]$$

and $$h_{p,i} = [h_p((i-1)N_x), \ldots, h_p(iN_x-1)]$$

are thus obtained, where $i=\{1, \ldots, X\}$.

In a second step, the $k_0$ first samples are subtracted from each sub-multiplet $h_{m,i}$ and the $k_0$ last samples are subtracted from each sub-multiplet $h_{p,i}$ (and therefore $Xk_0$ samples from each multiplet $h_m$ and from each multiplet $h_p$), where $k_0$ is the number of samples measured during the time it takes for the main antenna to reach the position of the predictor antenna, on the basis of an initial conjecture of the speed and of the acceleration of the vehicle.

In a third step, the average speed is estimated for each pair of sub-multiplets by maximizing the correlation between the sub-multiplets of this pair.

Finally, in a fourth step, an estimated acceleration $a_{c,est}$ and an estimated speed $v_{0,est}$ of the vehicle are obtained, for example by way of a linear regression, from the multiplet of speeds $$v = \{v_{i=1}, \ldots, v_{i=X}\}$$

representing the estimated speeds for the samples numbered $$k = \{N_x/2, 3N_x/2, \ldots, (2X-1)N_x/2\}.$$

It should be noted that the speed $v_0$ of the vehicle at the instant of the measurement of the sample k=0 is simply equal to $v_{0,est}$.

A second embodiment will now be described.

Just as for the first embodiment, the steps of this embodiment are implemented for at least one pair of multiplets comprising a multiplet of N samples $$h_m = [h_m(0), \ldots, h_m(N-1)]$$

measured at the main antenna, and a multiplet of N samples $$h_p = [h_p(0), \ldots, h_p(N-1)]$$

measured at the predictor antenna.

The samples numbered $$k = \{0, \ldots, N-1\}$$

are collected at time intervals $T_s$ (sampling time interval).

In a first step, the $k_0$ first samples measured at the main antenna and the $k_0$ last samples measured at the predictor antenna, where $k_0$ is the number of samples measured during the time it takes for the main antenna to reach the position of the predictor antenna, are subtracted on the basis of an initial conjecture of the initial speed $v_{0,init}$ and of the acceleration $a_{c,init}$. $k_0$ is thus the integer closest to the ratio $$\frac{d}{T_s \cdot v_{avg,init}},$$

where d is the distance between the main antenna and the predictor antenna, and $$v_{avg,init} = v_{0,init} + a_{c,init} N T_s / 2 \quad (2)$$

is the average speed conjectured over the time interval during which the N samples are measured.

The values chosen for $v_{0,init}$ and $a_{c,init}$ could for example be zero, or be the estimates resulting from the analysis of the previous dataset. The samples at the front main antenna $k_0$ are not associated with any sample at the predictor antenna at the same position, and therefore cannot be used. The multiplets of samples $$h'_m = [h_m(k_0), \ldots, h_m(N-1)]$$

and $$h'_p = [h_p(0), \ldots, h_p(N-1-k_0)] \text{ are thus obtained,}$$

each comprising $(N-k_0)$ samples.

In a second step, an integer $X>1$ is chosen freely, and each multiplet $h'_m$ and $h'_p$ is subdivided into X sub-multiplets of $$N_x = (N-k_0)/X$$

samples. The pairs of sub-multiplets $$h'_{m,i} = [h_m(k_0 + (i-1)N_x), \ldots, h_m(k_0 + iN_x - 1)]$$

and $$h'_{p,i} = [h_p((i-1)N_x), \ldots, h_p(iN_x - 1)] \text{ are thus obtained,}$$

where $i = \{1, \ldots, X\}$.

In a third step, the average speed is estimated for each such pair of sub-multiplets by maximizing the correlation between the sub-multiplets of this pair. This then gives a multiplet $$v = \{v_{i=1}, \ldots, v_{i=X}\}$$

representing the estimated speeds for the samples numbered $$k = \{(k_0 + N_x)/2, (k_0 + 3N_x)/2, \ldots, (k_0 + (2X-1)N_x/2\}$$

which correspond to the middle of each sub-multiplet.

Finally, in a fourth step, an estimated acceleration $a_c = a_{c,est}$ and an estimated speed $v_{0,est}$ of the vehicle are obtained, for example by way of a linear regression, from these speed estimates v.

The estimated speed $$v_0 = v_{avg,init} + v_{0,est} \quad (3)$$

of the vehicle at the instant of the measurement of the sample k=0 is deduced therefrom.

A third embodiment will now be described.

To this end, for each channel sample measured at the main antenna, a channel sample measured at the predictor antenna is first of all chosen on the basis of an initial estimate of the speed and of the acceleration. The sample of the predictor antenna is chosen so as to match a sample measured at the same position as the sample of the main antenna if the vehicle has moved at the estimated speed and the estimated acceleration. A mechanical model translates between the time domain and the spatial domain. The average correlation between the samples of the main antenna and the samples of the predictor antenna is then calculated, and then the speed/acceleration pair that optimizes a correlation coefficient between samples is determined.

The optimum speed/acceleration pair may be determined using a matrix search method by testing all realistic pairs, or using a gradient algorithm that estimates the gradient on the matrix and iteratively finds the value on the matrix that optimizes said given criterion.

In the context of this third embodiment, it is possible more specifically to proceed as follows:

The initial speed $v_0$ at the start of a series of measurements, and the speed v(t) at an instant t, satisfy $$v(t) = v_0 + a_c t. \quad (4)$$

Since the acceleration is assumed to be non-zero, it is necessary to define two time intervals. The first time interval, denoted $\Delta^+(t)$, is defined as the time it will take for the main antenna to reach the location where the predictor antenna is located at the instant t (movement d of the main antenna starting at the instant t). The second time interval, denoted $\Delta^-(t)$, is defined as the time elapsed since the predictor antenna was located at the location where the main antenna is located at the instant t (movement d of the predictor antenna finishing at the instant t).

These two time intervals are deduced from quadratic equations derived from equation (4), thereby giving (taking v(t)>0)

$$\Delta^+(t) = \frac{\sqrt{(v_0 + a_c t)^2 + 2 a_c d} - v_0 - a_c t}{a_c} \quad (5)$$

and $$\Delta^-(t) = \frac{v_0 - a_c t - \sqrt{(v_0 + a_c t)^2 + 2 a_c d}}{a_c}, \quad (6)$$

where $v_0$ is the speed at the instant t=0 corresponding to the first sample of each series of measurements.

The shifts $\Delta_k^+(k)$ and $\Delta_k^-(k)$ in terms of numbers of samples k corresponding respectively to $\Delta^+(t)$ and $\Delta^-(t)$ are deduced therefrom: $\Delta_k^+(k)$ is the integer closest to $\Delta^+(kT_s)/T_s$, and $\Delta_k^-(k)$ is the integer closest to $\Delta^-(kT_s)/T_s$, where $T_s$ is the sampling interval.

It will be noted that, in a multiplet $$h_m = [h_m(0), \ldots, h_m(N-1)]$$

of N samples $h_m(k)$ measured at the main antenna, samples with a number less than $k_0 = \Delta_k^+(0)$ are not associated with any sample at the predictor antenna at the current position of the main antenna, and therefore cannot be used, such that the number of usable samples is equal to $$N_k = N - k_0. \quad (7)$$

Using equations (5), (6) and the above values of the shifts $\Delta_k^+(k)$ and $\Delta_k^-(k)$, it is determined which samples should be associated for various conjectured pairs $(v_0, a_c)$.

The average correlation $\hat{c}(v_0, a_c)$ between a multiplet of samples $h_m$ measured at the main antenna and the associated multiplet $$h_p = [h_p(0), \ldots, h_p(N-1)]$$

of N samples $h_p(k)$ measured at the predictor antenna, for time intervals $\Delta^+(t)$ and $\Delta^-(t)$ that may vary over time, is given by $$\hat{c}(v_0, a_c) = \frac{1}{N_k} \sum_{k=k_0}^{N-1} \hat{c}_k(v_0, a_c), \quad (8)$$

-continued where $$\hat{c}_k(v_0, a_c) = h_m(kT_s)h_p^*((k - \Delta_k^-(k))T_s). \quad (9)$$

The effective value of the pair $(v_0, a_c)$ is finally obtained by determining which pair maximizes this average correlation. Specifically, for any estimate of the speed $v_0$ and of the acceleration $a_c$ that would not correspond to the effective values, the correlation would be calculated based on measurements taken at different positions; the correlation calculated with erroneous values is less than the correlation calculated on the basis of the effective value of the pair $(v_0, a_c)$.

It will finally be noted that, in the case of modulation of the radio signal using frequency multiplexing, the speed and the acceleration should be the same for all of the sub-carriers; the optimization algorithm should therefore preferably, for better efficiency, include a weighted sum of the correlation over all of the sub-carriers.

The invention may be implemented within an entity, for example a base station or an MSC, of a cellular communication network, by way of software components and/or hardware components.

The software components may be integrated into a conventional computer program for network node management. It is for this reason, as indicated above, that the present invention also relates to a computing system. This computing system includes, as is conventional, a central processing unit that uses signals to control a memory, and also an input unit and an output unit. Moreover, this computing system may be used to execute a computer program that includes instructions for implementing any one of the channel prediction methods according to the invention.

Specifically, another subject of the invention is a computer program able to be downloaded from a communication network and comprising instructions for executing the steps of a channel prediction method according to the invention when it is executed on a computer. This computer program may be stored on a computer-readable medium and may be able to be executed by a microprocessor.

This program may use any programming language, and may be in the form of source code, object code, or intermediate code between source code and object code, such as in a partially compiled form, or in any other desirable form.

Another subject of the invention is an irremovable, or partially or fully removable computer-readable information medium that includes instructions of a computer program as mentioned above.

The information medium may be any entity or device capable of storing the program. For example, the medium may comprise a storage means, such as a ROM, for example a CD ROM or a microelectronic circuit ROM, or a magnetic recording means, such as a hard disk, or else a USB stick ("USB flash drive").

Moreover, the information medium may be a transmissible medium such as an electrical or optical signal, which may be routed via an electrical or optical cable, by radio or by other means. The computer program according to the invention may in particular be downloaded from an Internet network.

As a variant, the information medium may be an integrated circuit in which the program is incorporated, the circuit being designed to execute or to be used in the execution of any one of the channel prediction methods according to the invention.

Although the present disclosure has been described with reference to one or more examples, workers skilled in the art will recognize that changes may be made in form and detail without departing from the scope of the disclosure and/or the appended claims.

The invention claimed is:

1. A channel prediction method performed by a network entity, the method comprising:
   predicting a radio channel between a transceiver and a connected vehicle, said vehicle comprising at least one antenna, known as "main antenna", dedicated to exchanges of payload data with said transceiver, and at least one other antenna, known as "predictor antenna", placed in front of the main antenna, an estimate of the radio channel at a current position of the predictor antenna making it possible to predict the radio channel that the main antenna will be dealing with when the main antenna reaches the current position of the predictor antenna, the predicting comprising:
   selecting, on the basis of an initial estimate of a speed and of an acceleration of the vehicle, for a given multiplet of channel samples measured at the main antenna, a multiplet of channel samples measured at the predictor antenna, each sample of the predictor antenna being selected such that the sample corresponds to a given sample of the main antenna subsequently measured at the same position, assuming that the vehicle has moved at said estimated speed and said estimated acceleration,
   calculating a criterion associating said multiplet of samples measured at the main antenna with said multiplet of samples measured at the predictor antenna,
   determining a speed/acceleration pair that optimizes said criterion, and,
   in order to predict the channel between the transceiver and the main antenna, selecting samples of the predictor antenna by way of said determined speed/acceleration pair.

2. The channel prediction method as claimed in claim 1, wherein the method comprises the network entity, for at least one pair of multiplets comprising a multiplet $$h_m = [h_m(0), \ldots, h_m(N-1)]$$

of N samples $h_m(k)$ measured at the main antenna, and a multiplet $$h_p = [h_p(0), \ldots, h_p(N-1)]$$

of N samples $h_p(k)$ measured at the predictor antenna, the following steps:
   choosing an integer $X>1$, and subdividing each multiplet $h_m$ and $h_p$ into X sub-multiplets each comprising $N_x = N/X$ samples, so as to obtain the pairs of sub-multiplets $$h_{m,i} = [h_m((i-1)N_x), \ldots, h_m(iN_x-1)]$$

and $$h_{p,i} = [h_p((i-1)N_x), \ldots, h_p(iN_x-1)],$$

where $i = \{1, \ldots, X\}$,
   subtracting $k_0$ first samples from each sub-multiplet $h_{m,i}$ and $k_0$ last samples from each sub-multiplet $h_{p,i}$, where $k_0$ is the number of samples measured during the time it takes for the main antenna to reach the position of the predictor antenna, on the basis of an initial conjecture of the speed and of the acceleration of the vehicle, estimating an average speed for each pair of sub-multiplets by maximizing a correlation between the sub-multiplets of each pair, obtaining the multiplet of speeds $v=\{v_{i=1}, \ldots, v_{i=X}\}$ representing the estimated speeds for the samples numbered $$k=\{N_x/2, 3N_x/2, \ldots, (2X-1)N_x/2\}, \text{ and}$$

obtaining, from said multiplet of speeds v, an estimated acceleration $a_{c,est}$ and an estimated speed $v_{0,est}$ of the vehicle, where $v_{0,est}$ is equal to the estimated speed of the vehicle at the instant of the measurement of the sample k=0.

3. The channel prediction method as claimed in claim 1, wherein the method comprises, for at least one pair of multiplets comprising a multiplet $$h_m=[h_m(0), \ldots, h_m(N-1)]$$

of N samples $h_m(k)$ measured at the main antenna, and a multiplet $$h_p=[h_p(0), \ldots, h_p(N-1)]$$

of N samples $h_p(k)$ measured at the predictor antenna, the network entity performing the following steps:

subtracting $k_0$ first samples measured at the main antenna and $k_0$ last samples measured at the predictor antenna, where $k_0$ is the number of samples measured during the time it takes for the main antenna to reach the position of the predictor antenna, on the basis of an initial conjecture of the speed and of the acceleration of the vehicle, so as to obtain the multiplets of samples $$h'_m=[h_m(k_0), \ldots, h_m(N-1)]$$

and $$h'_p=[h_p(0), \ldots, h_p(N-1-k_0)],$$

choosing an integer X>1, and subdividing each multiplet $h'_m$ and $h'_p$ into X sub-multiplets of $N_x=(N-k_0)/X$ samples, so as to obtain the pairs of sub-multiplets $$h'_{m,i}=[h_m(k_0+(i-1)N_x), \ldots, h_m(k_0+iN_x-1)]$$

and $$h'_{p,i}=[h_p((i-1)N_x), \ldots, h_p(iN_x-1)],$$

where $i=\{1, \ldots, X\}$, estimating, for each such pair of sub-multiplets, an average speed by maximizing a correlation between the sub-multiplets of each pair, so as to obtain a series of estimated speeds $v=\{v_{i=1}, \ldots, v_{i=x}\}$ representing the estimated speeds for samples numbered $$k=\{(k_0+N_x)/2, (k_0+3N_x)/2, \ldots, (k_0+(2X-1)N_x)/2\},$$

obtaining, from these speed estimates v, an estimated acceleration $a_c=a_{c,est}$ and an estimated speed $v_{0,est}$ of the vehicle, and deducing therefrom the estimated speed $$v_0=v_{avg,init}+v_{0,est}$$

of the vehicle at the instant of the measurement of the sample k=0, where $v_{avg,init}$ is the average speed conjectured over the time interval during which the N samples are measured.

4. The channel prediction method as claimed in claim 1, wherein the method comprises the network entity performing the following steps:

calculating a time interval $\Delta^+(t)$ representing the time it will take for the main antenna to reach the location where the predictor antenna is located at the instant t, calculating a time interval $\Delta^-(t)$ representing the time elapsed since the predictor antenna was located at the location where the main antenna is located at the instant t, deducing therefrom shifts $\Delta_k^+(k)$ and $\Delta_k^-(k)$ in terms of numbers of samples k corresponding respectively to $\Delta^+(t)$ and $\Delta^-(t)$, removing, in a multiplet of N samples measured at the main antenna, samples with a number less than $k_0=\Delta_k^+(0)$, for various conjectured pairs $(v_0, a_c)$, determining, by way of the values of $\Delta^+(t)$, $\Delta^-(t)$, $\Delta_k^+(k)$ and $\Delta_k^-(k)$, which samples measured at the main antenna should be associated with which samples measured at the predictor antenna, and calculating an average correlation between a multiplet of samples measured at the main antenna and the associated multiplet of samples measured at the predictor antenna, and determining which pair $(v_0, a_c)$ maximizes said average correlation.

5. The channel prediction method as claimed in claim 1, further comprising:

the network entity receiving the channel samples measured at the main antenna; and the network entity receiving the channel samples measured at the predictor antenna.

6. The channel prediction method as claimed in claim 5, further comprising:

the connected vehicle measuring the channel samples at the main antenna; and the connected vehicle measuring the channel samples at the predictor antenna.

7. The channel prediction method as claimed in claim 5, further comprising:

receiving an antenna signal from the main antenna; and pre-equalizing the antenna signal using the prediction of the radio channel.

8. A network entity used in prediction of a radio channel between a transceiver and a connected vehicle, said vehicle comprising at least one antenna, known as "main antenna", dedicated to exchanges of payload data with said transceiver, and at least one other antenna, known as "predictor antenna", placed in front of the main antenna, an estimate of the radio channel at a current position of the predictor antenna making it possible to predict the radio channel that the main antenna will be dealing with when the main antenna reaches the current position of the predictor antenna, wherein the network entity comprises:

a processor; and a non-transitory computer-readable medium comprising instructions stored thereon or incorporated therein, which when executed by the processor configure the network entity to:

select, on the basis of an initial estimate of a speed and of an acceleration of the vehicle, for a given multiplet of channel samples measured at the main antenna, a multiplet of channel samples measured at the predictor antenna, each sample of the predictor antenna being selected such that the sample corresponds to a given sample of the main antenna subsequently measured at the same position, assuming that the vehicle has moved at said estimated speed and said estimated acceleration, calculate a criterion associating said multiplet of samples measured at the main antenna with said multiplet of samples measured at the predictor antenna, determine a speed/acceleration pair that optimizes said criterion, and, in order to predict the radio channel between the transceiver and the main antenna, select samples of the predictor antenna by way of said determined speed/acceleration pair.

9. The network entity as claimed in claim 8, wherein the instructions further configure the network entity to, for at least one pair of multiplets comprising a multiplet $$h_m=[h_m(0),\ldots,h_m(N-1)]$$

of N samples $h_m(k)$ measured at the main antenna, and a multiplet $$h_p=[h_p(0),\ldots,h_p(N-1)]$$

of N samples $h_p(k)$ measured at the predictor antenna:

choose an integer X>1, and subdividing each multiplet $h_m$ and $h_p$ into X sub-multiplets each comprising $N_x=N/X$ samples, so as to obtain the pairs of sub-multiplets $$h_{m,i}=[h_m((i-1)N_x),\ldots,h_m(iN_x-1)]$$

and $$h_{p,i}=[h_p((i-1)N_x),\ldots,h_p(iN_x-1)],$$

where $i=\{1,\ldots,X\}$, subtract $k_0$ first samples from each sub-multiplet $h_{m,i}$, and $k_0$ last samples from each sub-multiplet $h_{p,i}$, where $k_0$ is the number of samples measured during the time it takes for the main antenna to reach the position of the predictor antenna, on the basis of an initial conjecture of the speed and of the acceleration of the vehicle, estimate an average speed for each pair of sub-multiplets by maximizing a correlation between the sub-multiplets of each pair, obtain the multiplet of speeds $v=\{v_{i=1},\ldots,v_{i=x}\}$ representing the estimated speeds for the samples numbered $$k=\{N_x/2, 3N_x/2,\ldots,(2X-1)N_x/2\}, \text{ and}$$

obtain, from said multiplet of speeds v, an estimated acceleration $a_{c,est}$ and an estimated speed $v_{0,est}$ of the vehicle, where $v_{0,est}$ is equal to the estimated speed of the vehicle at the instant of the measurement of the sample k=0.

10. The network entity as claimed in claim 8, the instructions further configure the network entity to, for at least one pair of multiplets comprising a multiplet $$h_m=[h_m(0),\ldots,h_m(N-1)]$$

of N samples $h_m(k)$ measured at the main antenna, and a multiplet $$h_p=[h_p(0),\ldots,h_p(N-1)]$$

of N samples $h_p(k)$ measured at the predictor antenna:

subtract $k_0$ first samples measured at the main antenna and $k_0$ last samples measured at the predictor antenna, where $k_0$ is the number of samples measured during the time it takes for the main antenna to reach the position of the predictor antenna, on the basis of an initial conjecture of the speed and of the acceleration of the vehicle, so as to obtain the multiplets of samples $$h'_m=[h_m(k_0),\ldots,h_m(N-1)]$$

and $$h'_p=[h_p(0),\ldots,h_p(N-1-k_0)],$$

choose an integer X>1, and subdividing each multiplet $h'_m$ and $h'_p$ into X sub-multiplets of $N_x=(N-k_0)/X$ samples, so as to obtain the pairs of sub-multiplets $$h'_{m,i}=[h_m(k_0+(i-1)N_x),\ldots,h_m(k_0+iN_x-1)]$$

and $$h'_{p,i}=[h_p((i-1)N_x),\ldots,h_p(iN_x-1)],$$

where $i=\{1,\ldots,X\}$, estimate, for each such pair of sub-multiplets, an average speed by maximizing a correlation between the sub-multiplets of each pair, so as to obtain a series of estimated speeds $v=\{v_{i=1},\ldots,v_{i=x}\}$ representing the estimated speeds for samples numbered $$k=\{(k_0+N_x)/2, (k_0+3N_x)/2,\ldots,(k_0+(2X-1)N_x)/2\},$$

obtain, from these speed estimates v, an estimated acceleration $a_c=a_{c,est}$ and an estimated speed $v_{0,est}$ of the vehicle, and deduce therefrom the estimated speed $$v_0=v_{avg,init}+v_{0,est}$$

of the vehicle at the instant of the measurement of the sample k=0, where $v_{avg,init}$ is the average speed conjectured over the time interval during which the N samples are measured.

11. The network entity as claimed in claim 8, wherein the instructions further configure the network entity to:

calculate a time interval $\Delta^+(t)$ representing the time it will take for the main antenna to reach the location where the predictor antenna is located at the instant t, calculate a time interval $\Delta^-(t)$ representing the time elapsed since the predictor antenna was located at the location where the main antenna is located at the instant t, deduce therefrom shifts $\Delta_k^+(k)$ and $\Delta_k^-(k)$ in terms of numbers of samples k corresponding respectively to $\Delta^+(t)$ and $\Delta^-(t)$, remove, in a multiplet of N samples measured at the main antenna, samples with a number less than $k_0=\Delta_k^+(0)$, for various conjectured pairs $(v_0, a_c)$, determine, by way of the values of $\Delta^+(t)$, $\Delta^-(t)$, $\Delta_k^+(k)$ and $\Delta_k^-(k)$, which samples measured at the main antenna should be associated with which samples measured at the predictor antenna, and calculate an average correlation between a multiplet of samples measured at the main antenna and the associated multiplet of samples measured at the predictor antenna, and determine which pair $(v_0, a_c)$ maximizes said average correlation.

12. The network entity as claimed in claim 8, wherein the network entity is accommodated in a base station or in an MSC (Mobile Switching Center) of a cellular communication network.

13. A communication network comprising:

at least one network entity as claimed in claim 8, and at least one vehicle equipped with at least one main antenna and with at least one predictor antenna.

14. A non-transitory computer-readable medium comprising instructions stored thereon, which when executed by a processor of a network entity configure the network entity to:

predict a radio channel between a transceiver and a connected vehicle, said vehicle comprising at least one antenna, known as "main antenna", dedicated to exchanges of payload data with said transceiver, and at least one other antenna, known as "predictor antenna", placed in front of the main antenna, an estimate of the radio channel at a current position of the predictor antenna making it possible to predict the radio channel that the main antenna will be dealing with when the main antenna reaches the current position of the predictor antenna, the predicting comprising:

selecting, on the basis of an initial estimate of a speed and of an acceleration of the vehicle, for a given multiplet of channel samples measured at the main antenna, a multiplet of channel samples measured at the predictor antenna, each sample of the predictor antenna being selected such that the sample corresponds to a given sample of the main antenna subsequently measured at the same position, assuming that the vehicle has moved at said estimated speed and said estimated acceleration, calculating a criterion associating said multiplet of samples measured at the main antenna with said multiplet of samples measured at the predictor antenna, determining a speed/acceleration pair that optimizes said criterion, and, in order to predict the channel between the transceiver and the main antenna, selecting samples of the predictor antenna by way of said determined speed/acceleration pair.

* * * * *